US012771054B2

(12) United States Patent
Ho

(10) Patent No.: US 12,771,054 B2
(45) Date of Patent: Oct. 20, 2026

(54) POWER CONNECTOR ASSEMBLY

(71) Applicant: Molex, LLC, Lisle, IL (US)

(72) Inventor: Yi-Tse Ho, New Taipei City (TW)

(73) Assignee: Molex, LLC, Lisle, IL (US)

( * ) Notice: Subject to any disclaimer, the term of this patent is extended or adjusted under 35 U.S.C. 154(b) by 318 days.

(21) Appl. No.: 18/619,192

(22) Filed: Mar. 28, 2024

(65) Prior Publication Data

US 2024/0347942 A1 Oct. 17, 2024

(30) Foreign Application Priority Data

Apr. 12, 2023 (CN) ........................ 202320798629.X

(51) Int. Cl.
*H01R 12/71* (2011.01)
*H01R 13/187* (2006.01)

(52) U.S. Cl.
CPC ......... *H01R 12/716* (2013.01); *H01R 13/187* (2013.01)

(58) Field of Classification Search
CPC ............................ H01R 12/716; H01R 13/187
USPC ........................................................... 439/78
See application file for complete search history.

(56) References Cited

U.S. PATENT DOCUMENTS 6,719,584 B1 * 4/2004 Favro ................ H01R 13/5208 439/499
7,056,148 B2 * 6/2006 Staniszewski ..... H01R 13/5045 439/444
9,270,052 B1 * 2/2016 Martin ............... H01R 13/6315
10,410,812 B2 * 9/2019 Zhu ...................... H01H 31/023
10,651,592 B2 * 5/2020 Cerfeuillet ............ F16B 37/065
11,211,749 B2 * 12/2021 Cave .................. H01R 13/5841
11,264,752 B1 * 3/2022 Durse .................. H01R 13/113
11,588,257 B2 * 2/2023 Watanabe ................. F16F 1/12
(Continued)

FOREIGN PATENT DOCUMENTS

CN 100440620 C 12/2008
CN 203553422 U 4/2014

*Primary Examiner* — Harshad C Patel

(57) ABSTRACT

A power connector assembly includes a first mating terminal, a busbar, a first receptacle and a position-limiting member. The first mating terminal is mounted to the first board and electrically connects the first board, the first mating terminal has a fitting portion and a supporting rod and a mating rod which extend from the fitting portion and are arranged as a step from large to small, the mating rod and the supporting rod therebetween have a position-limiting step portion, the first mating terminal is mounted to the first board by means of the fitting portion. The first receptacle is mounted to the busbar and electrically connects the busbar, the first receptacle includes a conductive shell which is mounted to the busbar and a conductive spring which is provided in the conductive shell and is electrically connected with the conductive shell, the mating rod of the first mating terminal inserts into the first receptacle. The position-limiting member is provided to the mating rod of the first mating terminal, the first receptacle is retained between the position-limiting step portion of the first mating terminal and the position-limiting member with a gap, and the first receptacle is capable of rotating relative to the mating rod, so that the busbar is capable of rotating relative to the first mating terminal and the first board.

9 Claims, 9 Drawing Sheets

(56) References Cited

U.S. PATENT DOCUMENTS

| | | | | |
|---|---|---|---|---|
| 11,695,230 | B2 * | 7/2023 | Liu | H01R 4/28<br>439/816 |
| 12,424,780 | B2 * | 9/2025 | Peterson | H01R 13/5221 |
| 12,438,306 | B2 * | 10/2025 | Kitaoka | H01R 13/516 |
| 12,567,692 | B2 * | 3/2026 | Kanematsu | H01R 13/193 |
| 12,640,528 | B2 * | 5/2026 | Liu | H01R 13/6315 |
| 2009/0308721 | A1 * | 12/2009 | Beaulieu | C25C 3/14<br>200/276 |
| 2023/0170636 | A1 * | 6/2023 | Zhang | H01R 13/111<br>439/248 |

* cited by examiner

POWER CONNECTOR ASSEMBLY

RELATED APPLICATION

The present application claims priority to Chinese Patent Application No. 202320798629.X filed on Apr. 12, 2023, which is incorporated by reference in its entirety.

TECHNICAL FIELD

The present disclosure relates to a connector assembly, and particularly relates to a power connector assembly.

BACKGROUND

Chinese patent document CN203553422U (corresponding to United State patent U.S. Pat. No. 9,640,882B2) discloses a connector, the connector includes one male pin and one female pin, the male pin includes a large-diameter part and a small-diameter part, the large-diameter part is used to cooperate with an elastic sheet of a female seat, the small-diameter part is used to cooperate with a pin bar extending-out hole of the female seat. When the male pin and the female pin mate with each other, the small-diameter part of the male pin firstly passes through a clamping portion of the elastic sheet, the male pin continues to insert, the small-diameter part of the male pin passes out the pin bar extending-out hole of the female pin, subsequently the large-diameter part contacts the elastic sheet of the female pin, so that the male pin mates with the female pin in place. However, the small-diameter part of the male pin disclosed in this patent document is only used to function as guiding, and after the small-diameter part of the male pin passes out the pin bar extending-out hole, there is not any limiting construction with respect to the small-diameter part of the male pin, so the male pin possibly detaches from the female pin in the mating state.

SUMMARY

Therefore, an object of the present disclosure is to provide a power connector assembly can improve at least one problem of prior art.

Accordingly, in some embodiments, power connector assembly of the present disclosure is adapted to be mounted to a first board, the power connector assembly comprises a first mating terminal, a busbar, a first receptacle and a position-limiting member. The first mating terminal is mounted to the first board and electrically connects the first board, the first mating terminal has a fitting portion and a supporting rod and a mating rod which extend from the fitting portion and are arranged as a step from large to small, the mating rod and the supporting rod therebetween have a position-limiting step portion constituted by the step, the first mating terminal is mounted to the first board by means of the fitting portion. The first receptacle is mounted to the busbar and electrically connects the busbar, the first receptacle comprises a conductive shell which is mounted to the busbar and a conductive spring which is provided in the conductive shell and is electrically connected with the conductive shell, wherein, the mating rod of the first mating terminal inserts into the first receptacle and elastically contacts and electrically connects the conductive spring. The position-limiting member is provided to a tip of the mating rod of the first mating terminal, the first receptacle is retained between the position-limiting step portion of the first mating terminal and the position-limiting member with a gap, and the first receptacle is capable of rotating relative to the mating rod, so that the busbar is capable of rotating relative to the first mating terminal and the first board.

In some embodiments, the position-limiting member is constructed as locking-type position-limiting member.

In some embodiments, the position-limiting member comprises an internal screw thread hole which is constructed to the tip of the mating rod, a screw which is locked in the internal screw thread hole, and a gasket which is interposed between the screw and the tip of the mating rod.

In some embodiments, the busbar has a second fitting hole, the conductive shell of the first receptacle is mounted to the second fitting hole of the busbar, the conductive shell has an inserting passageway which is barrel-shaped, is positioned inside the conductive shell and extends coaxially with the second fitting hole, the conductive spring is assembled in the inserting passageway of the conductive shell, the conductive spring is barrel-shaped and has a plurality of contact elastic pieces which are circumferentially arranged, extend inwardly and are used to contact the mating rod of the first mating terminal.

In some embodiments, the power connector assembly is further adapted to be mounted to a second board, the power connector assembly further comprises a second mating terminal and a second receptacle which are assembled between the busbar and the second board, the second mating terminal cooperatively mate with the second receptacle.

In some embodiments, the second board has a fourth fitting hole, the second receptacle is mounted to the fourth fitting hole of the second board and electrically connects the second board, the second receptacle comprises a conductive outer shell, a conductive inner shell, a biasing spring and a conductive spring, the conductive outer shell is mounted to the second board and electrically connects the second board, the conductive outer shell has an annular receiving groove which is positioned inside the conductive outer shell, the conductive inner shell has an inserting passageway which is positioned inside the conductive inner shell and an annular flange portion which protrudes circumferentially from an outer wall surface of the conductive inner shell, the annular flange portion of the conductive inner shell is assembled in the annular receiving groove of the conductive outer shell, the biasing spring is assembled between the annular flange portion and the annular receiving groove, so that the conductive inner shell electrically connects the conductive outer shell, the conductive spring of the second receptacle is assembled in the inserting passageway of the conductive inner shell and electrically connects the conductive inner shell; the second mating terminal has a fixing portion which is mounted to the busbar and a mating portion which extends from the fixing portion, the mating portion of the second mating terminal inserts into the inserting passageway of the second receptacle and elastically contacts and electrically connects the conductive spring of the second receptacle.

In some embodiments, the first board has a first fitting hole, the fitting portion of the first mating terminal comprises a fitting surface which faces the first board and a positioning post which protrudes from the fitting surface, the positioning post inserts into the first fitting hole of the first board, the fitting portion is fixed on the first board by welding.

In some embodiments, the fitting surface is provided with a standing protrusion, the standing protrusion stands on a surface of the first board to raise the fitting surface and the supporting rod.

In some embodiments, the first board has a first fitting hole, the fitting portion of the first mating terminal comprises a fitting surface which faces the first board, a positioning post which protrudes from the fitting surface, and a fitting member which is provided to a tip of the positioning post, the positioning post inserts into the first fitting hole of the first board, the first board is interposed between the fitting surface and the fitting member.

That the position-limiting member of the present disclosure is provided to the tip of the mating rod can prevent the first receptacle and the busbar from being detached from the first mating terminal. In addition, because the first receptacle is retained between the position-limiting step portion of the first mating terminal and the position-limiting member with a gap, and each contact elastic piece of the conductive spring elastically contacts the mating rod of the first mating terminal in a circumferential direction, so the first receptacle is capable of rotating relative to the mating rod, the busbar is capable of rotating relative to the first mating terminal and the first board. As such, it can increase various variations of assembling positions, permit larger assembling tolerance, and can absorb displacement variation of each component generated by an operating state and a circumstance action.

BRIEF DESCRIPTION OF THE DRAWINGS

Other features and effects of the present disclosure will be apparent from embodiments with reference to the drawings, in which.

DETAILED DESCRIPTION

Figure 1:
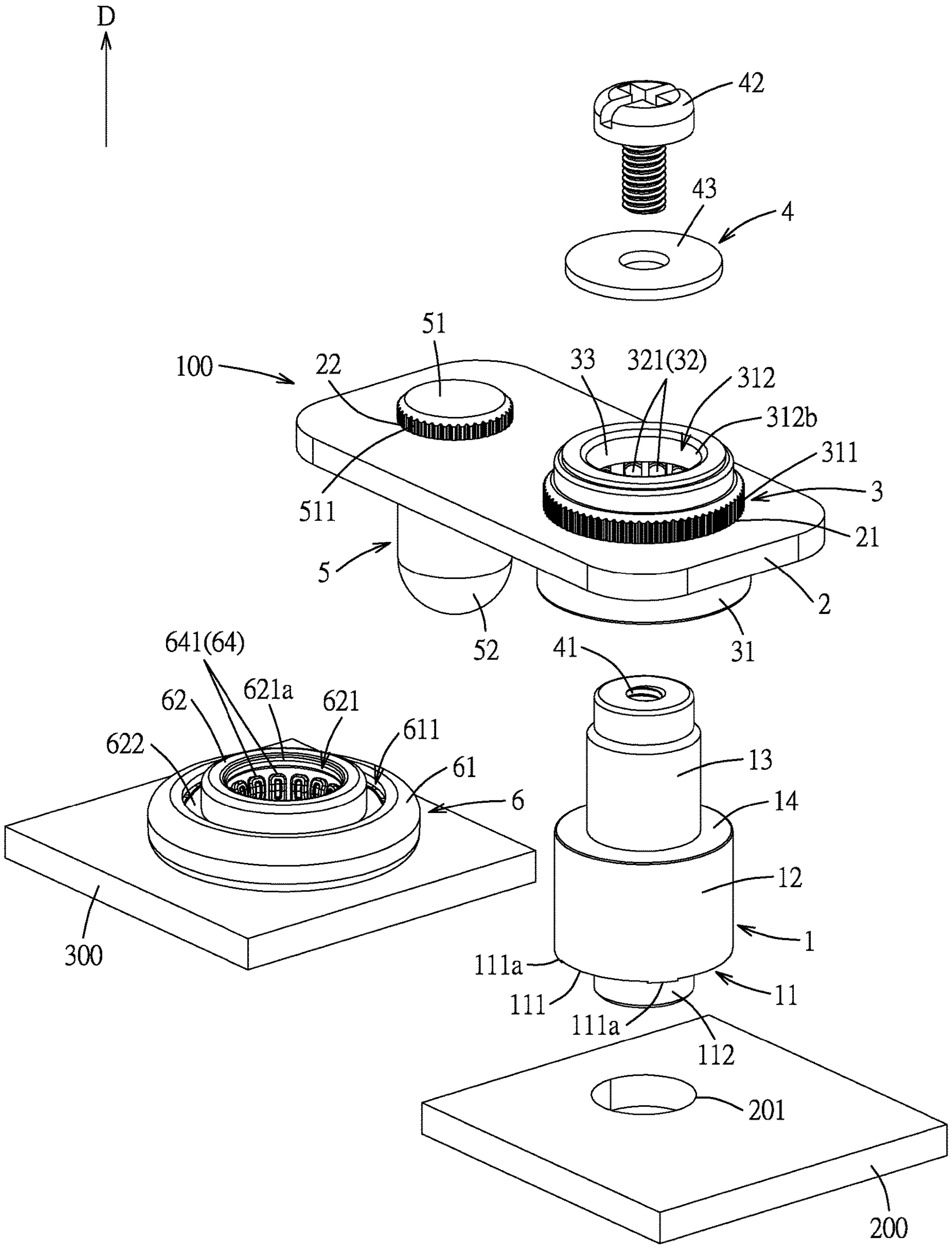
FIG. 1 is a perspective exploded view of a first embodiment of a power connector assembly of the present disclosure, a first board and a second board.
Figure 2:
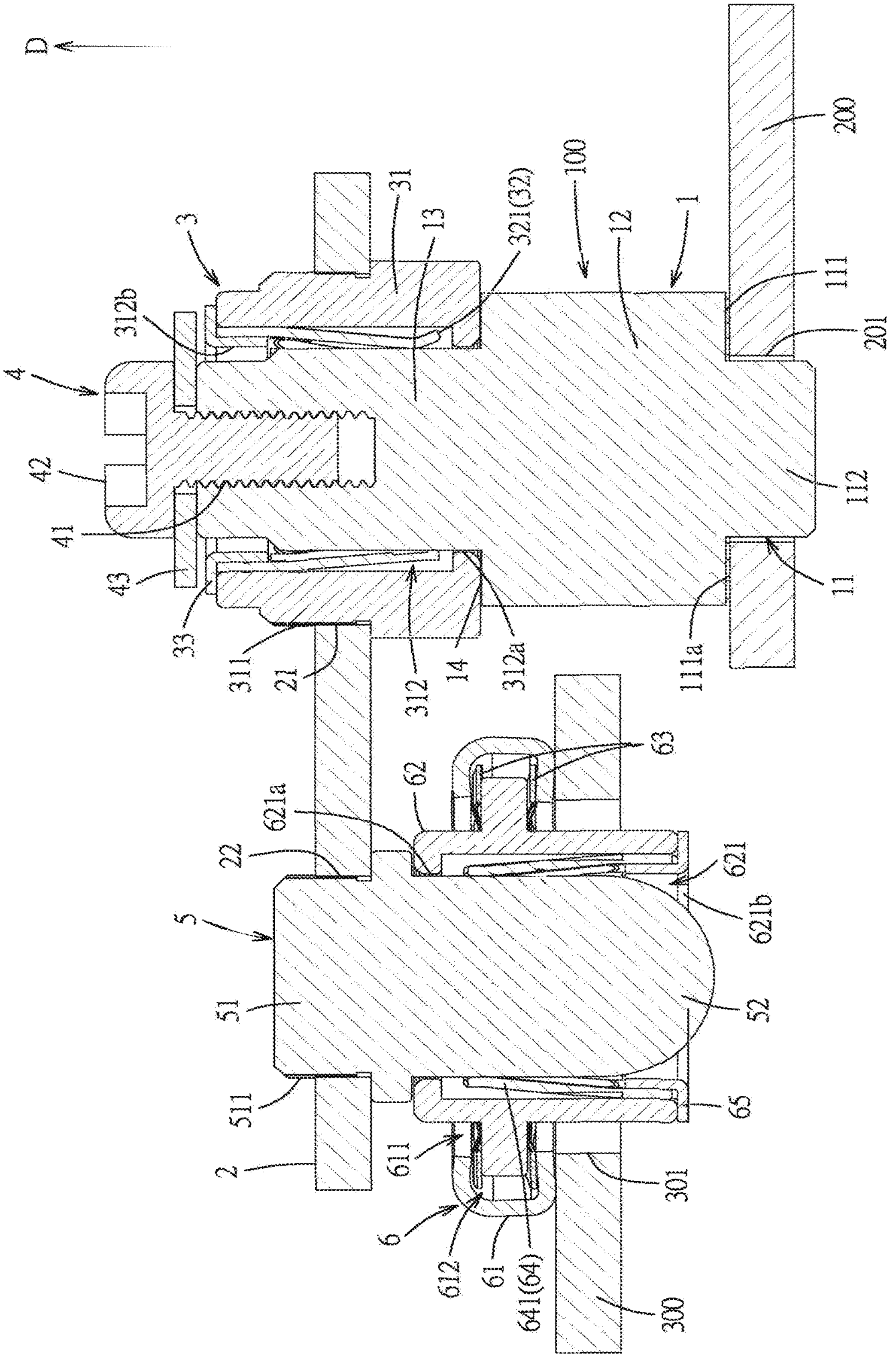
FIG. 2 is a cross sectional view of the first embodiment.
Figure 3:
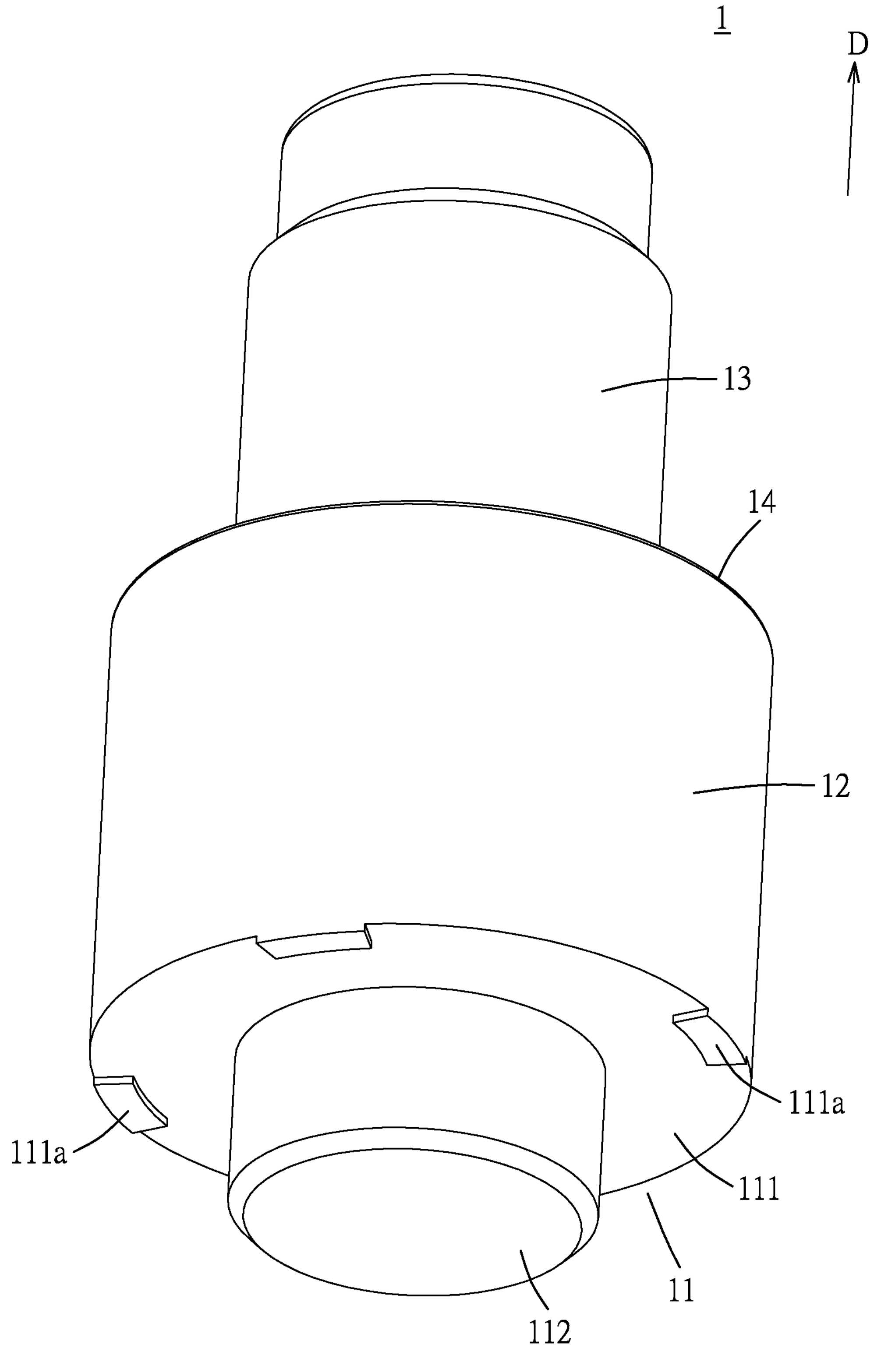
FIG. 3 is a perspective view of a first mating terminal of the first embodiment.
Figure 4:
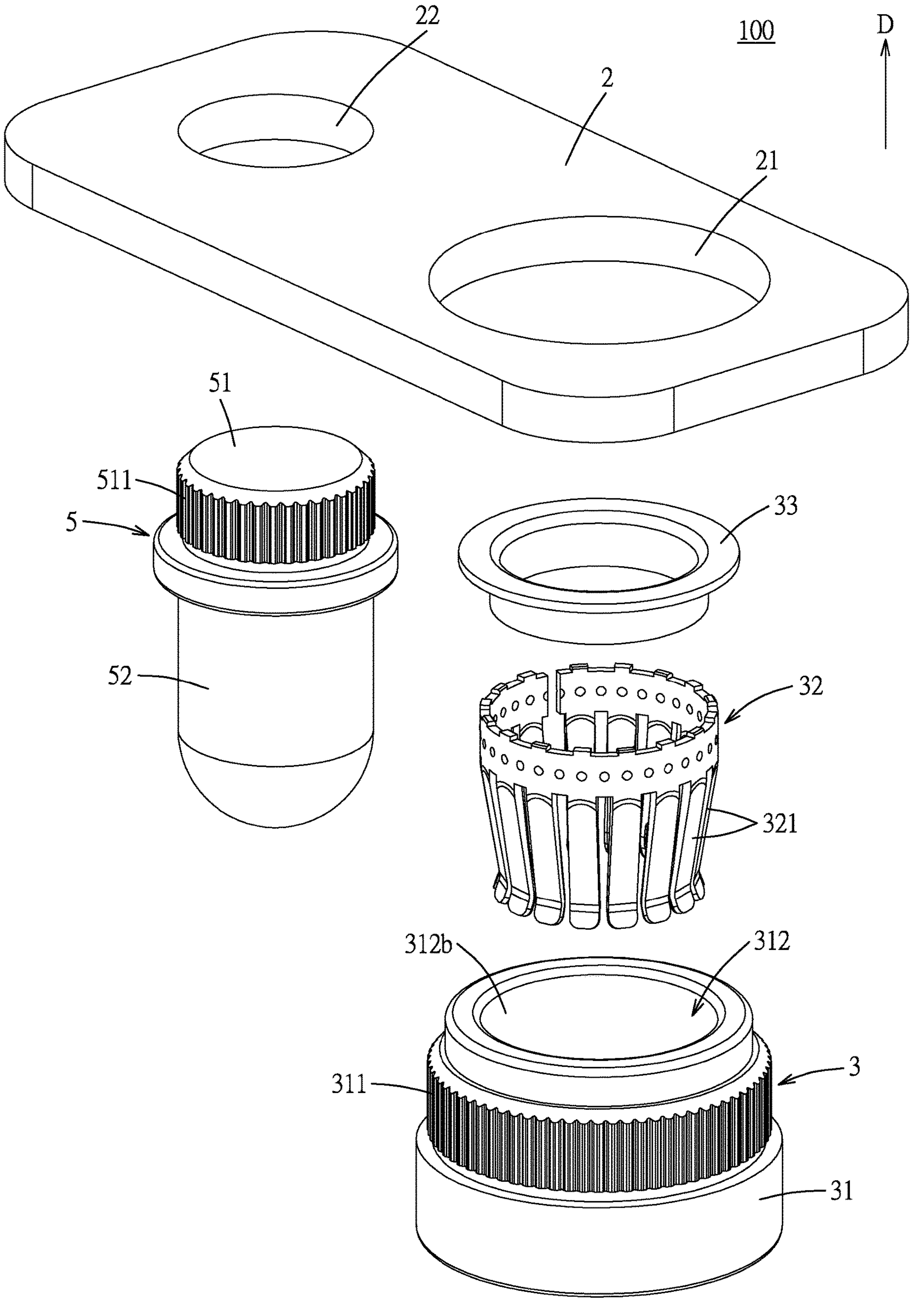
FIG. 4 is a perspective exploded view of a busbar, a first receptacle and a second mating terminal of the first embodiment.
Figure 5:
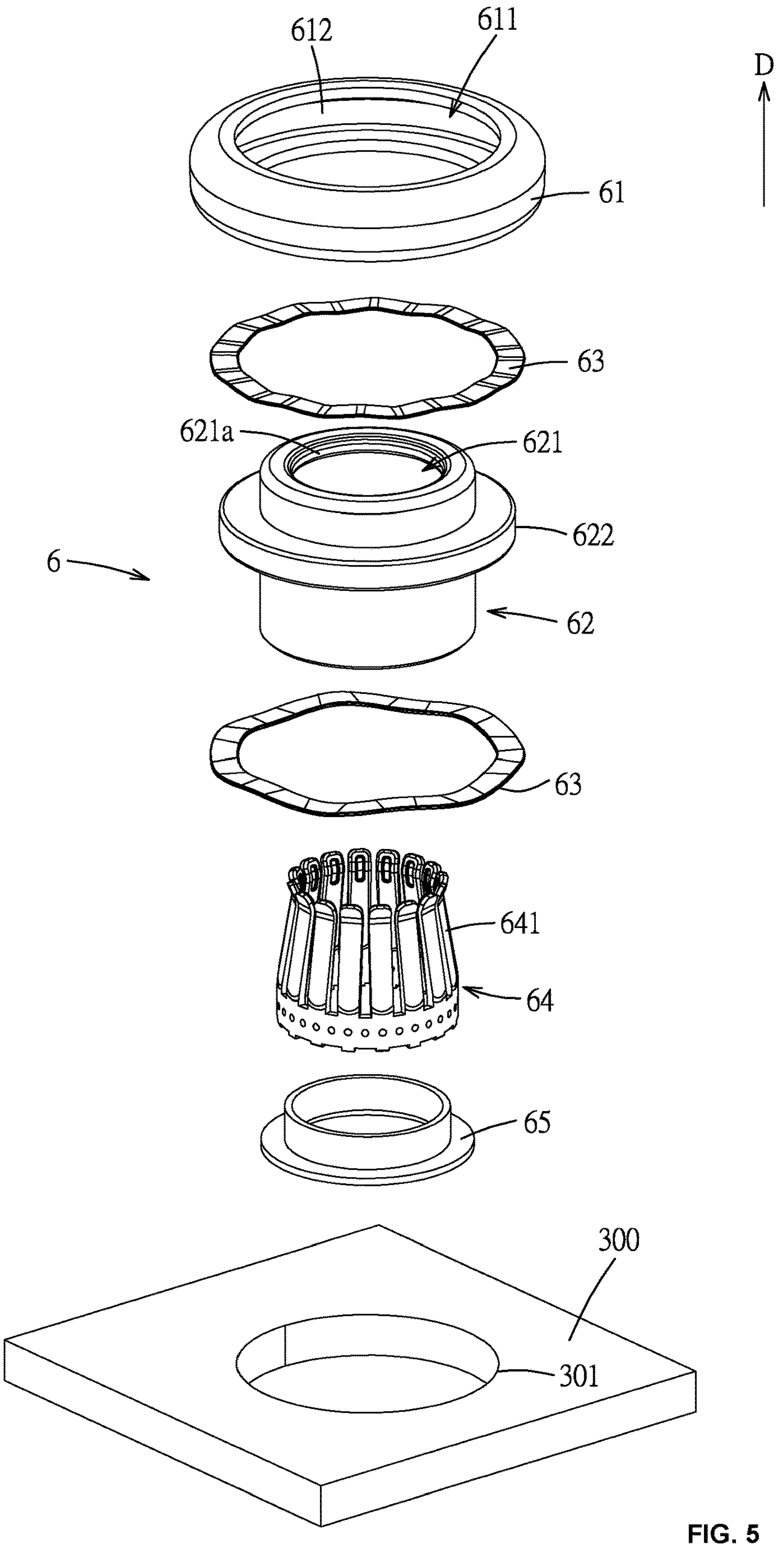
FIG. 5 is a perspective exploded view of a second receptacle of the first embodiment and the second board.

Before the present disclosure is described in detail, it is noted that the similar elements are indicated by the same reference numerals in the following description.

Referring to FIG. 1 to FIG. 4, a first embodiment of a power connector assembly 100 of the present disclosure is adapted to be mounted between a first board 200 and a second board 300. The power connector assembly 100 includes a first mating terminal 1, a busbar 2, a first receptacle 3, a position-limiting member 4, a second mating terminal 5 and a second receptacle 6. In the first embodiment, the first board 200 and the second board 300 are circuit boards.

The first mating terminal 1 is constructed by a rigid body of a metal material, a construction of the first mating terminal 1 basically is a long rod which is circular in cross section and extends along a mating direction D (in figures, a direction to which an arrow points is up, and an opposite direction is down). The first mating terminal 1 is mounted to the first board 200 and electrically connects the first board 200. The first mating terminal 1 has a fitting portion 11 which is positioned at a bottom end of the first mating terminal 1 and a supporting rod 12 and a mating rod 13 which extend upwardly from a top portion of the fitting portion 11 along the mating direction D, are coaxial and are arranged as a step from large to small. A radial width of the mating rod 13 is smaller than a radial width of the supporting rod 12, so that the mating rod 13 and the supporting rod 12 therebetween have a position-limiting step portion 14 constituted by the step.

The first mating terminal 1 is mounted to a first fitting hole 201 of the first board 200 by means of the fitting portion 11. The fitting portion 11 of the first mating terminal 1 includes a fitting surface 111 which downwardly faces an upper surface of the first board 200 and is constructed as a bottom surface of the supporting rod 12 and a positioning post 112 which protrudes downwardly from the fitting surface 111. The positioning post 112 inserts into the first fitting hole 201 of the first board 200, and the fitting portion 11 is fixed on the first board 200 by welding and electrically connects a power line (not shown) on the first board 200. In addition, in the first embodiment, the fitting surface 111 is provided with a plurality of standing protrusions 111*a*, the plurality of standing protrusions 111*a* stand on the upper surface of the first board 200 to raise the fitting surface 111 and the supporting rod 12, the first embodiment fixes the fitting portion 11, which is at the bottom end of the first mating terminal 1, on the first board 200 by through-hole type welding, in other implementing manners, the fitting portion 11 of the first mating terminal 1 also may be fixed on the first board 200 by surface welding or mechanical fixing. For example, if the first board 200 is a circuit board as the first embodiment, the first mating terminal 1 may connect a conductive pad or a conductive joint on the first board 200 via the fitting surface 111 to electrically connect the power line on the first board 200.

The busbar 2 is a metal plate body which has conductivity, a plate body of the busbar 2 is substantially perpendicular to the mating direction D (that is, plate surfaces are toward the up and the down), the busbar 2 has a second fitting hole 21 and a third fitting hole 22 which are respectively positioned at two end portions of the busbar 2.

The first receptacle 3 is mounted to the busbar 2 and electrically connects the busbar 2. The first receptacle 3 includes a conductive shell 31 which is mounted to the second fitting hole 21 of the busbar 2, a conductive spring 32 which is provided in the conductive shell 31 and is electrically connected with the conductive shell 31, and a spring fixing seat 33 which is provided to the conductive shell 31 and is used to fix the conductive spring 32. The conductive shell 31 has an engaging tooth ring 311 which is positioned on an outer circumferential surface of the conductive shell 31 and is annular and an inserting passageway 312 which is barrel-shaped, is positioned inside the conductive shell 31 and extends coaxially with the second fitting hole 21. The engaging tooth ring 311 of the conductive shell 31 tightly fits the second fitting hole 21 of the busbar 2, so that the conductive shell 31 is fixed to the second fitting hole 21 of the busbar 2, specifically, the conductive shell 31 and the busbar 2 therebetween also may be further applied with welding.

The inserting passageway 312 has an inlet 312*a* and an outlet 312*b* which are arranged along the mating direction D, the inlet 312*a* is positioned in the down, the outlet 312*b* is positioned in the up. The conductive spring 32 is assembled in the inserting passageway 312 of the conductive shell 31 and electrically connects the conductive shell 31, the conductive spring 32 is barrel-shaped and has a plurality of contact elastic pieces 321 which are circumferentially arranged, extend inwardly and are used to contact the mating rod 13 of the first mating terminal 1. The spring fixing seat 33 partially extends into the inserting passageway 312 of the first receptacle 3 and the spring fixing seat 33 and the conductive shell 31 of the first receptacle 3 together clamp a top end part of the conductive spring 32.

The mating rod 13 of the first mating terminal 1 inserts into the inserting passageway 312 of the first receptacle 3 from the inlet 312*a* and elastically contacts and electrically connects the plurality of contact elastic piece 321 of the conductive spring 32. A length of the mating rod 13 in the mating direction D is larger than a length of the inserting passageway 312 of the conductive shell 31 of the first receptacle 3 in the mating direction D, a tip of the mating rod 13 extends out of the outlet 312*b* of the inserting passageway 312.

The position-limiting member 4 is constructed as locking-type position-limiting member. The position-limiting member 4 is provided to the tip of the mating rod 13 of the first mating terminal 1, the position-limiting member 4 includes an internal screw thread hole 41 which is constructed to the tip of the mating rod 13, a screw 42 which is locked in the internal screw thread hole 41, and a gasket 43 which is interposed between the screw 42 and the tip of the mating rod 13. A radial dimension of the gasket 43 is larger than a radial dimension of the mating rod 13, the first receptacle 3 has is retained between the position-limiting step portion 14 of the first mating terminal 1 and the gasket 43 of the position-limiting member 4 with a gap, and the first receptacle 3 is capable of rotating relative to the mating rod 13, so that the busbar 2 is capable of rotating relative to the first mating terminal 1 and the first board 200.

Specifically, that the position-limiting member 4 is provided to the tip of the mating rod 13 can prevent the first receptacle 3 and the busbar 2 from being detached from the first mating terminal 1. A distance between the position-limiting step portion 14 and the gasket 43 of the position-limiting member 4 is larger than a length of the first receptacle 3 of the conductive shell 31 along the mating direction D, so that the first receptacle 3 has the gap between the position-limiting step portion 14 and the position-limiting member 4 along the mating direction D, although the first receptacle 3 is limited in position in the mating direction D, the first receptacle 3 may still move up and down with the gap along the mating direction D. In other words, the first receptacle 3 is not deadlocked such that the first receptacle 3 cannot move. Moreover, each contact elastic piece 321 of the conductive spring 32 elastically contacts the mating rod 13 of the first mating terminal 1 in a circumferential direction, therefore the first receptacle 3 is capable of rotating relative to the mating rod 13, so that the busbar 2 is capable of rotating relative to the first mating terminal 1 and the first board 200.

The second mating terminal 5 and the second receptacle 6 are assembled between the busbar 2 and the second board 300, the second mating terminal 5 cooperatively mates with the second receptacle 6. In the first embodiment, the second mating terminal 5 is assembled to the busbar 2, the second receptacle 6 is assembled to the second board 300. But in other implementing manners, the second mating terminal 5 also may be assembled to the second board 300, but the second receptacle 6 is assembled to the busbar 2.

Referring to FIG. 2 to FIG. 5, the second receptacle 6 is mounted to a fourth fitting hole 301 of the second board 300 and electrically connects the second board 300. The second receptacle 6 includes a conductive outer shell 61, a conductive inner shell 62, two biasing springs 63, a conductive spring 64, and a spring fixing seat 65. The conductive outer shell 61 is constructed as a ring shape and has a middle hole 611 which is positioned inside the conductive outer shell 61 and an annular receiving groove 612, an opening of the annular receiving groove 612 inwardly faces the middle hole 611 and the annular receiving groove 612 is positioned at a periphery of the middle hole 611. The conductive outer shell 61 is assembled to an upper surface of the second board 300, for example, the conductive outer shell 61 may be fixed on the second board 300 by welding and electrically connects a power line (not shown) of the second board 300, and the middle hole 611 of the conductive outer shell 61 substantially corresponds to the fourth fitting hole 301 of the second board 300.

The conductive inner shell 62 has an inserting passageway 62 which is positioned inside the conductive inner shell 62 and extends coaxially with the middle hole 611 and the fourth fitting hole 301 along the mating direction D, and an annular flange portion 622 which protrudes circumferentially from an outer wall surface of the conductive inner shell 62. The inserting passageway 621 has an inlet 621*a* and an outlet 621*b* which are arranged along mating direction D, the inlet 621*a* is positioned in the up, the outlet 621*b* is positioned in the down. The annular flange portion 622 of the conductive inner shell 62 is assembled in the annular receiving groove 612 of the conductive outer shell 61.

The two biasing springs 63 are respectively assembled between the annular flange portion 622 and the annular receiving groove 612, in the two biasing springs 63, one biasing spring 63 is interposed between a top surface of the annular flange portion 622 and the annular receiving groove 612, the other biasing spring 63 is interposed between a bottom surface of the annular flange portion 622 and the annular receiving groove 612, so that the conductive inner shell 62 electrically connects the conductive outer shell 61, and so that the conductive inner shell 62 is capable of moving relative to conductive outer shell 61 in the mating direction D and in a circumferential direction.

The conductive spring 64 is assembled in the inserting passageway 621 of the conductive inner shell 62 and electrically connects the conductive inner shell 62, the conductive spring 64 is barrel-shaped and has a plurality of contact elastic pieces 641 which are circumferentially arranged, extend inwardly and are used to contact the second mating terminal 5. The spring fixing seat 65 partially extends into the inserting passageway 621 of the conductive inner shell 62 and the spring fixing seat 65 and the conductive inner shell 62 together clamp a bottom end part of the conductive spring 64.

Referring to FIG. 1 to FIG. 4, the second mating terminal 5 is constructed by a rigid body of a metal material, the second mating terminal 5 is basically constructed as a long rod which is circular in cross section and extends along the mating direction D. The second mating terminal 5 has a fixing portion 51 which is mounted to the third fitting hole 22 of the busbar 2 and a mating portion 52 which extends downwardly from the fixing portion 51 along the mating direction D. The fixing portion 51 is constructed to have an engaging tooth ring 511 which is positioned at an outer circumferential surface of the fixing portion 51 and is annular, the engaging tooth ring 511 of the fixing portion 51 tightly fits the third fitting hole 22 of the busbar 2, so that the second mating terminal 5 is fixed to the third fitting hole 22 of the busbar 2. The mating portion 52 of the second mating terminal 5 inserts into the inserting passageway 621 of the second receptacle 6 from the inlet 621*a* and elastically contacts and electrically connects the plurality of contact elastic pieces 641 of the conductive spring 64.

Figure 6:
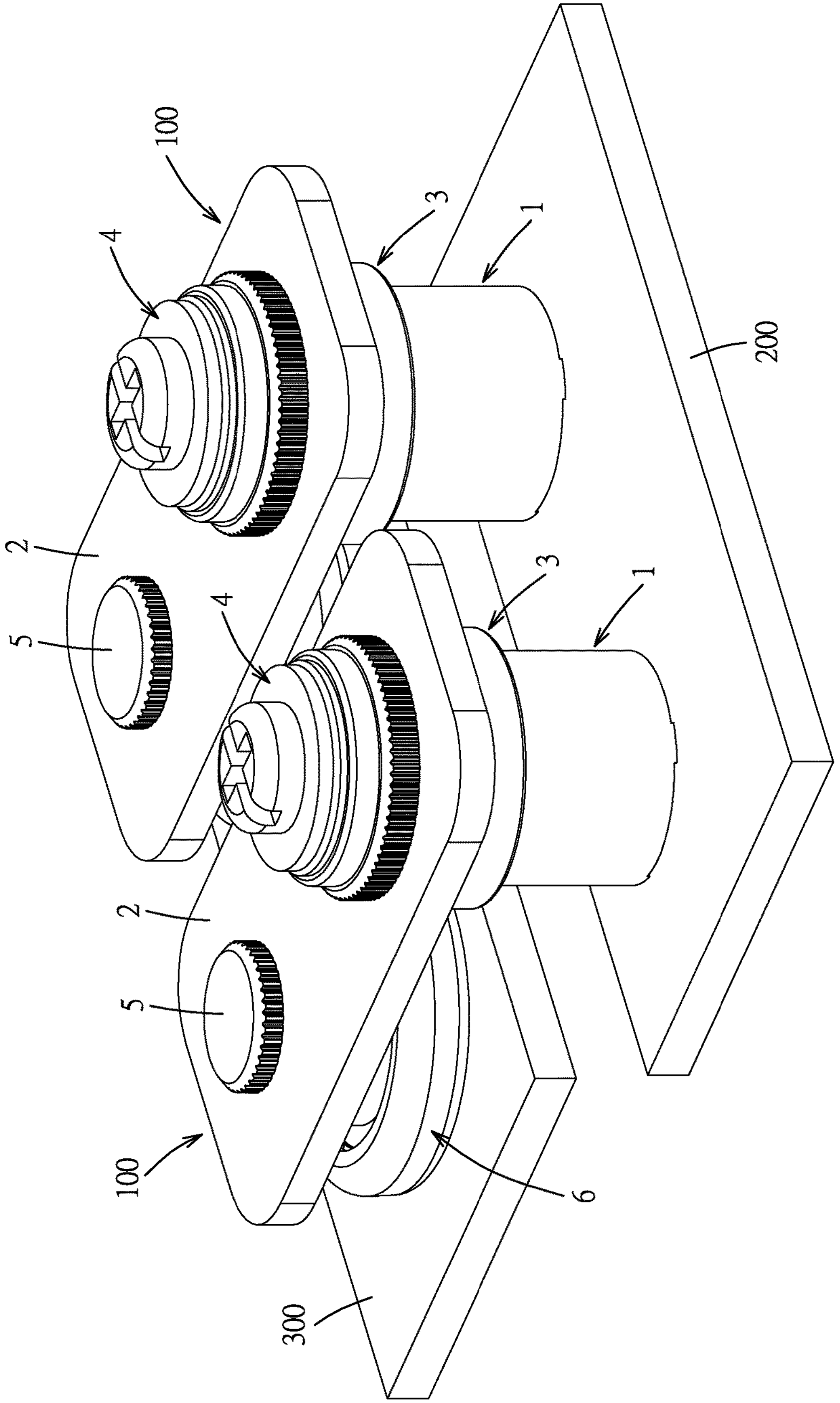
FIG. 6 is a perspective exploded view of the two first embodiments which respectively act as a positive electrode and a negative electrode of a transmission power and are applied between the first board and the second board.

Referring to FIG. 6, basically, at least using the two power connector assemblies 100 to be respectively acting as a positive electrode and a negative electrode of a transmission power, a power may be transmitted from the first board 200 to the second board 300 via the busbars 2 of the two power connector assemblies 100.

Figure 7:
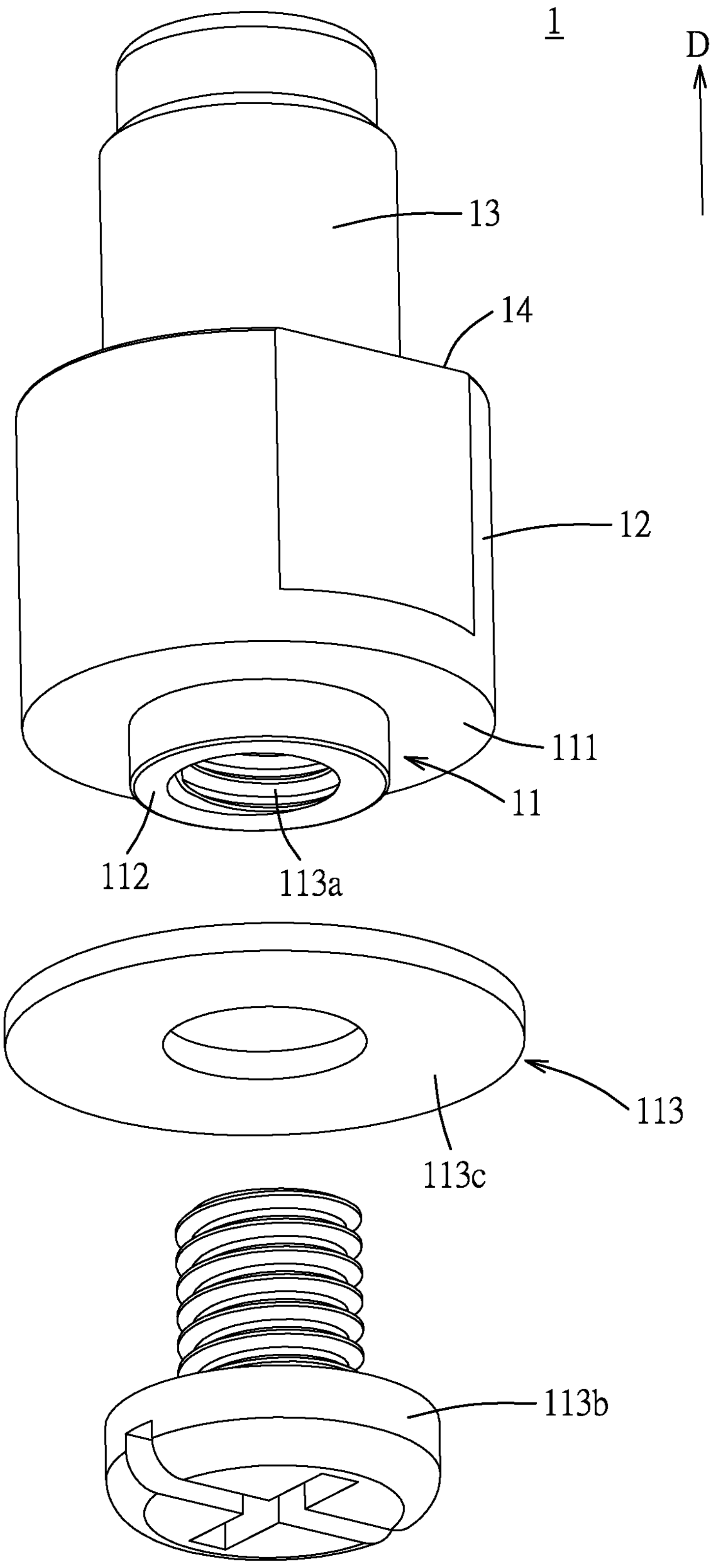
FIG. 7 is a perspective exploded view of the first mating terminal of a second embodiment of the power connector assembly of the present disclosure.
Figure 8:
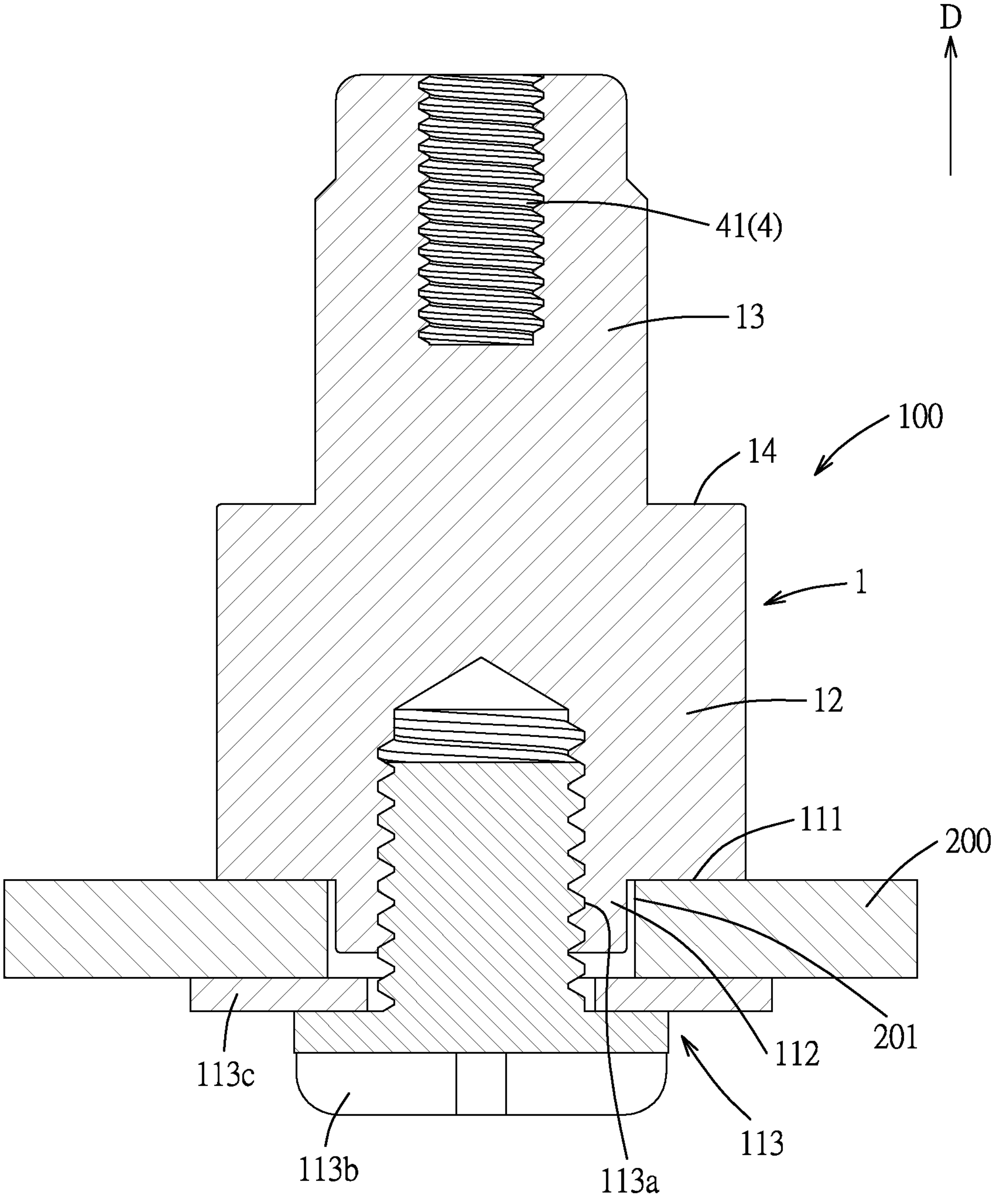
FIG. 8 is a cross sectional view of the first mating terminal and the first board of the second embodiment.

Referring to FIG. 7 and FIG. 8, a second embodiment of the power connector assembly 100 of the present disclosure differs from the first embodiment in that, the fitting portion 11 of the first mating terminal 1 further includes a fitting member 113 which is provided to a tip of the positioning post 112. The positioning post 112 downwardly inserts into the first fitting hole 201 of the first board 200, the first board 200 is interposed between the fitting surface 111 and the fitting member 113. The fitting member 113 is constructed as locking-type fitting member, the fitting member 113 includes an internal screw thread hole 113*a* which is constructed to the tip of the positioning post 112, a screw 113*b* which is locked in the internal screw thread hole 113*a*, and a gasket 113*c* which is interposed between the screw 113*b* and a lower surface of the first board 200.

In an assembling process, firstly the positioning post 112 inserts into the first fitting hole 201 of the first board 200, the fitting surface 111 abuts against the upper surface of the first board 200, the screw 113*b* is upwardly locked in the internal screw thread hole 113*a* at the bottom surface of the positioning post 112 from the lower surface of the first board 200, the gasket 113*c* is interposed between the screw 113*b* and the lower surface of the first board 200. Because a radial dimension of the gasket 113*c* is larger than a radial dimension of the positioning post 112 and a radial dimension of the first fitting hole 201, the fitting surface 111 and the gasket 113*c* and the screw 113*b* are respectively positioned at the two surfaces of the first board 200, so that the first mating terminal 1 is fixed on the first board 200. For example, the fitting surface 111 may contact a conductive pad (not shown) or a conductive joint (not shown) on the first board 200 to electrically connect the power line on the first board 200.

Figure 9:
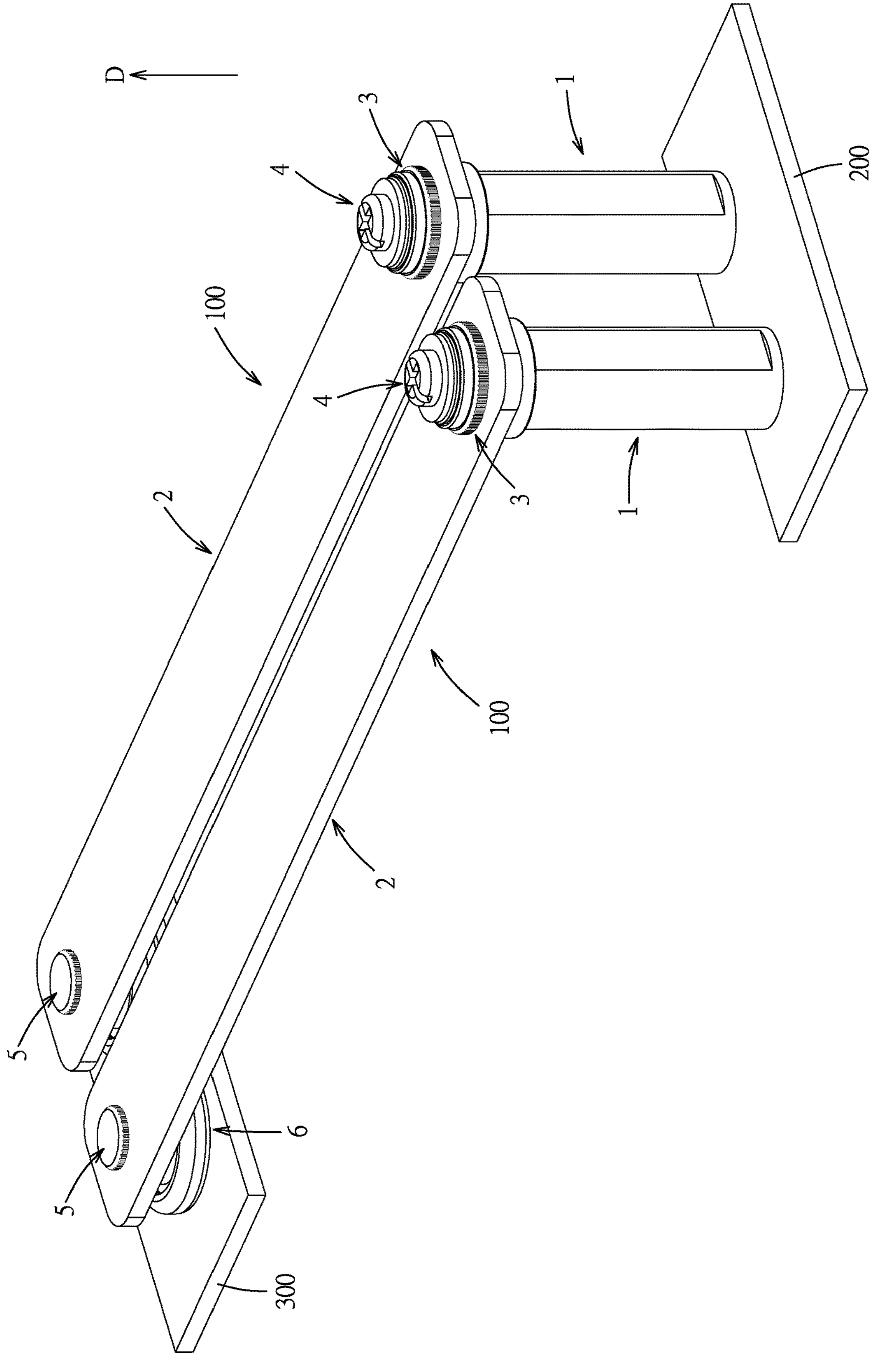
FIG. 9 is a perspective view of a third embodiment of the power connector assembly of the present disclosure.

Referring to FIG. 9, a third embodiment of the power connector assembly 100 of the present disclosure differs from the first embodiment in that, a dimension of the supporting rod 12 of the first mating terminal 1 along the mating direction D is longer, and a dimension of the busbar 2 is also longer. Therefore, the first board 200 and the second board 300 therebetween can be spaced apart by a larger distance.

In conclusion, that the position-limiting member 4 of the present disclosure is provided to the tip of the mating rod 13 can prevent the first receptacle 3 and the busbar 2 from being detached from the first mating terminal 1. In addition, because the first receptacle 3 is retained between the position-limiting step portion 14 of the first mating terminal 1 and the position-limiting member 4 with a gap, and each contact elastic piece 321 of the conductive spring 32 elastically contacts the mating rod 13 of the first mating terminal 1 in a circumferential direction, so the first receptacle 3 is capable of rotating relative to the mating rod 13, the busbar 2 is capable of rotating relative to the first mating terminal 1 and the first board 200. As such, it can increase various variations of assembling positions, permit larger assembling tolerance, and can absorb displacement variation of each component generated by an operating state and a circumstance action.

However, the above description is only for the embodiments of the present disclosure, and it is not intended to limit the implementing scope of the present disclosure, and the simple equivalent changes and modifications made according to the claims and the contents of the specification are still included in the scope of the present disclosure.

What is claimed is:

1. A power connector assembly, being adapted to be mounted to a first board, wherein the power connector assembly comprises:

a first mating terminal mounted to the first board and electrically connecting the first board, the first mating terminal has a fitting portion and a supporting rod and a mating rod which extend from the fitting portion and are arranged as a step from large to small, the mating rod and the supporting rod therebetween have a position-limiting step portion constituted by the step, the first mating terminal being mounted to the first board by means of the fitting portion;

a busbar;

a first receptacle mounted to the busbar and electrically connecting the busbar, the first receptacle comprises a conductive shell which is mounted to the busbar and a conductive spring which is provided in the conductive shell and is electrically connected with the conductive shell, wherein, the mating rod of the first mating terminal inserts into the first receptacle and elastically contacts and electrically connects the conductive spring;

a position-limiting member provided to a tip of the mating rod of the first mating terminal, the first receptacle is retained between the position-limiting step portion of the first mating terminal and the position-limiting member with a gap, and the first receptacle is capable of rotating relative to the mating rod, so that the busbar is capable of rotating relative to the first mating terminal and the first board.

2. The power connector assembly of claim 1, wherein the position-limiting member is constructed as locking-type position-limiting member.

3. The power connector assembly of claim 2, wherein the position-limiting member comprises an internal screw thread hole which is constructed to the tip of the mating rod, a screw which is locked in the internal screw thread hole, and a gasket which is interposed between the screw and the tip of the mating rod.

4. The power connector assembly of claim 1, wherein the busbar has a second fitting hole, the conductive shell of the first receptacle is mounted to the second fitting hole of the busbar, the conductive shell has an inserting passageway which is barrel-shaped, is positioned inside the conductive shell and extends coaxially with the second fitting hole, the conductive spring is assembled in the inserting passageway of the conductive shell, the conductive spring is barrel-shaped and has a plurality of contact elastic pieces which are circumferentially arranged, extend inwardly and are used to contact the mating rod of the first mating terminal.

5. The power connector assembly of claim 1, wherein the power connector assembly is further adapted to be mounted to a second board, the power connector assembly further comprises a second mating terminal and a second receptacle which are assembled between the busbar and the second board, the second mating terminal cooperatively mate with the second receptacle.

6. The power connector assembly of claim 5, wherein the second board has a fourth fitting hole, the second receptacle is mounted to the fourth fitting hole of the second board and electrically connects the second board, the second receptacle comprises a conductive outer shell, a conductive inner shell, a biasing spring and a conductive spring, the conductive outer shell is mounted to the second board and electrically connects the second board, the conductive outer shell has an annular receiving groove which is positioned inside the conductive outer shell, the conductive inner shell has an inserting passageway which is positioned inside the conductive inner shell and an annular flange portion which protrudes circumferentially from an outer wall surface of the conductive inner shell, the annular flange portion of the conductive inner shell is assembled in the annular receiving groove of the conductive outer shell, the biasing spring is assembled between the annular flange portion and the annular receiving groove, so that the conductive inner shell electrically connects the conductive outer shell, the conductive spring of the second receptacle is assembled in the inserting passageway of the conductive inner shell and electrically connects the conductive inner shell;

the second mating terminal has a fixing portion which is mounted to the busbar and a mating portion which extends from the fixing portion, the mating portion of the second mating terminal inserts into the inserting passageway of the second receptacle and elastically contacts and electrically connects the conductive spring of the second receptacle.

7. The power connector assembly of claim 1, wherein the first board has a first fitting hole, the fitting portion of the first mating terminal comprises a fitting surface which faces the first board and a positioning post which protrudes from the fitting surface, the positioning post inserts into the first fitting hole of the first board, the fitting portion is fixed on the first board by welding.

8. The power connector assembly of claim 7, wherein the fitting surface is provided with a standing protrusion, the standing protrusion stands on a surface of the first board to raise the fitting surface and the supporting rod.

9. The power connector assembly of claim 1, wherein the first board has a first fitting hole, the fitting portion of the first mating terminal comprises a fitting surface which faces the first board, a positioning post which protrudes from the fitting surface, and a fitting member which is provided to a tip of the positioning post, the positioning post inserts into the first fitting hole of the first board, the first board is interposed between the fitting surface and the fitting member.

* * * * *